INVENTOR
WILLIAM E. BRADFORD,
BY Kimmel, Crowell & Weaver.
ATTORNEYS.

Sept. 16, 1969   W. E. BRADFORD   3,467,152
CIRCULAR GANG SAW
Filed Oct. 25, 1967   3 Sheets-Sheet 3
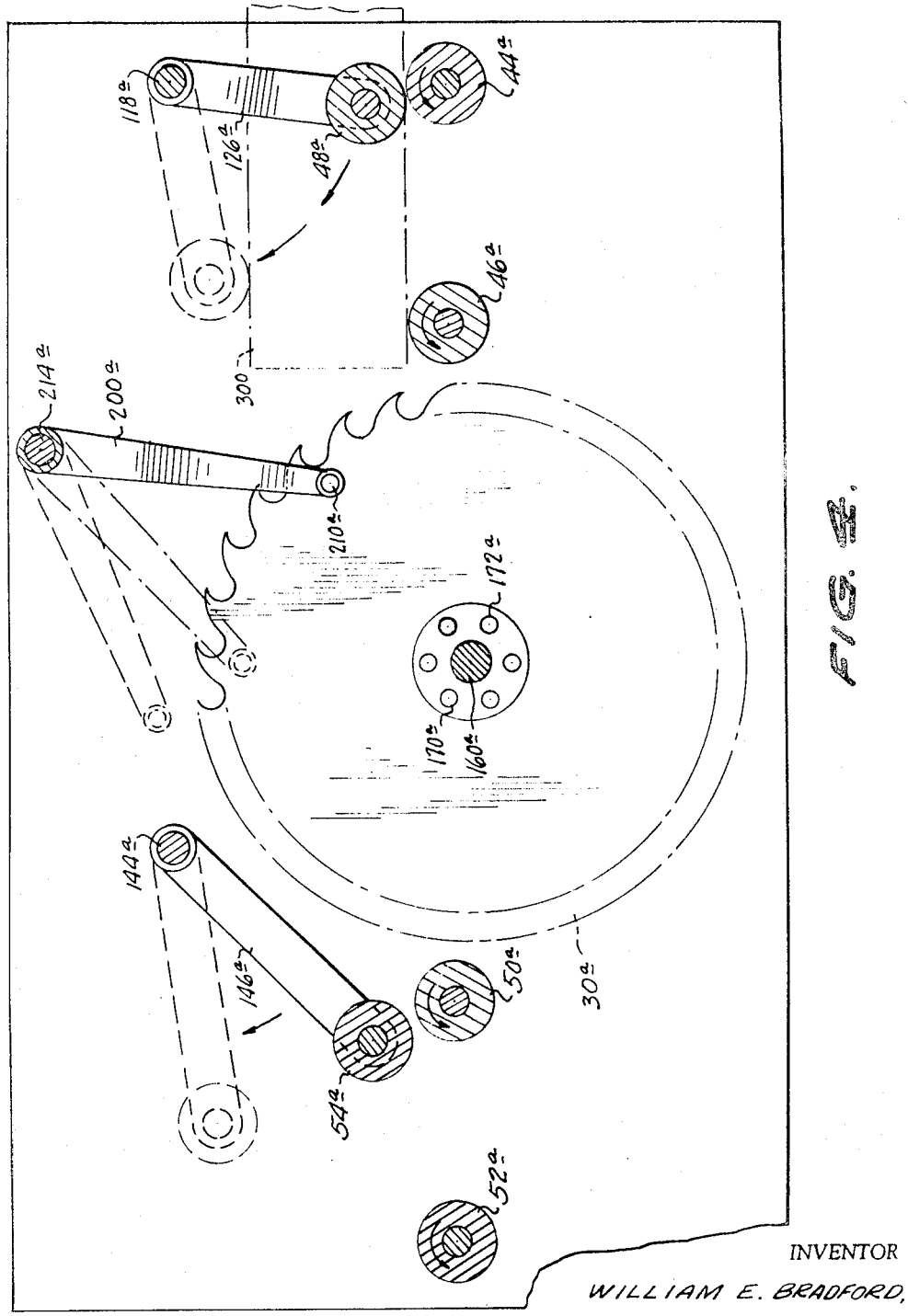
INVENTOR
WILLIAM E. BRADFORD,
BY Kimmel, Crowell & Weaver
ATTORNEYS.

United States Patent Office 3,467,152
Patented Sept. 16, 1969

3,467,152
CIRCULAR GANG SAW
William E. Bradford, 1503 National,
Helena, Mont. 59601
Filed Oct. 25, 1967, Ser. No. 678,083
Int. Cl. B27b 5/34
U.S. Cl. 143—37          10 Claims

ABSTRACT OF THE DISCLOSURE

A circular gang saw of the type which has a plurality of circular saw blades mounted and driven for rotation for splitting a log or the like into a plurality of pieces wherein the saws are mounted for rotation and for free reciprocable movement on a shaft and may be driven by a plurality of rods extending through apertures in the saws, said saws being held in predetermined relation by means of guides positioned between the saws and held in place by pivotally mounted arms is disclosed.

BACKGROUND OF THE INVENTION

Field of the invention

This invention relates to wood saws generally and more particularly to multiple cut circular wood saws.

Description of the prior art

Circular gang saws generally are known in the prior art. For example, Patent No. 261,645, Winter, describes a gang circular saw mill. It is also known in the prior art to provide for guide means for positioning individual saws or a plurality of saws. For example, Patent Nos. 674,997, Christensen; 1,744,499, Pelton; 1,150,551, Sparks; 1,055,182, Joyce and 1,064,336, Joyce, disclose guides for positioning saws or for engaging the edge of saws to move them from one fixed position to another fixed position or for preventing vibration during rotation of saws. It is not known in the prior art, however, to provide for a plurality of guides which are positioned between a plurality of relatively movable circular saws for simultaneously engaging the sides of two such saws for positioning such saws relative to each other. It is, accordingly, an object of this invention to provide an improved circular gang saw in which the gang saws are held in spaced relation by guides which engage the sides of two adjacent saws.

It is known in the prior art to provide for drive connections or couplings using spaced rods or flexible members. For example, Patent No. 2,696,719, discloses a flexible coupling in which drive is provided through a plurality of spaced coupling pins which are, in that case, flexible and resilient. A coupling using spaced pins is also disclosed in Patent No. 2,972,240, Wood, and No. 2,451,683, Mantle. A connection which includes a pair of pins for securing a saw in fixed relation between two relatively immovable fixed collars is disclosed in Patent No. 81,661, McDonald. It is common practice, however, where circular saws are mounted for reciprocable movement on a shaft to drive the saws through a key or the like secured in the shaft and engaging the saws. While this is satisfactory where the saw can be clamped tightly between collars on each side it has not proved entirely satisfactory for reciprocably mounted saws. The saw tends to bind up on the key and ceases to move freely. This is often true even though an enlarged enforcing collar is provided on the saw. It is, accordingly, another object of the invention to provide an improved drive connection between a saw and a saw drive means.

SUMMARY

The present invention contemplates a gang circular saw in which the saws are driven by means of a plurality of spaced rods received in apertures in the saws, the rods being connected to a rotatable shaft or collar for driving the saws. The present invention also contemplates the provision of a plurality of pivotally mounted arms which carry on the ends thereof gauging guides for engaging the sides of two adjacent saws and positioning said saws in a desired spaced relation. It is, therefore, a principal object of the invention to provide an improved ganged circular saw.

A more specific object of the invention is the provision of novel guide means for spacing the saws in a desired relative spaced relation.

A further specific object of the invention is the provision of a gang circular saw assembly where the saws are driven by a plurality of spaced apart rods which rods are in turn caused to revolve about a center point.

A further object of the invention is the provision of novel means for driving a board or a log or the like through a gang circular saw set, said drive means consisting of one or more driven rollers and a roller designed to press the board against said driven rollers.

The specific construction disclosed herein constitutes an important object of the invention and other objects of the invention will become apparent from the drawings to which reference is now made and from the specification which follows.

BRIEF DESCRIPTION OF THE DRAWINGS

FIGURE 3 is a detailed view in partial cutaway in cross section taken substantially alonge lines 3—3 looking from above toward the plane of the sheet, as shown in FIGURE 1.

FIGURE 4 is a partial schematic view of an alternative construction of the invention as shown in FIGURE 1.

DESCRIPTION OF THE PREFERRED EMBODIMENT

Figure 1:
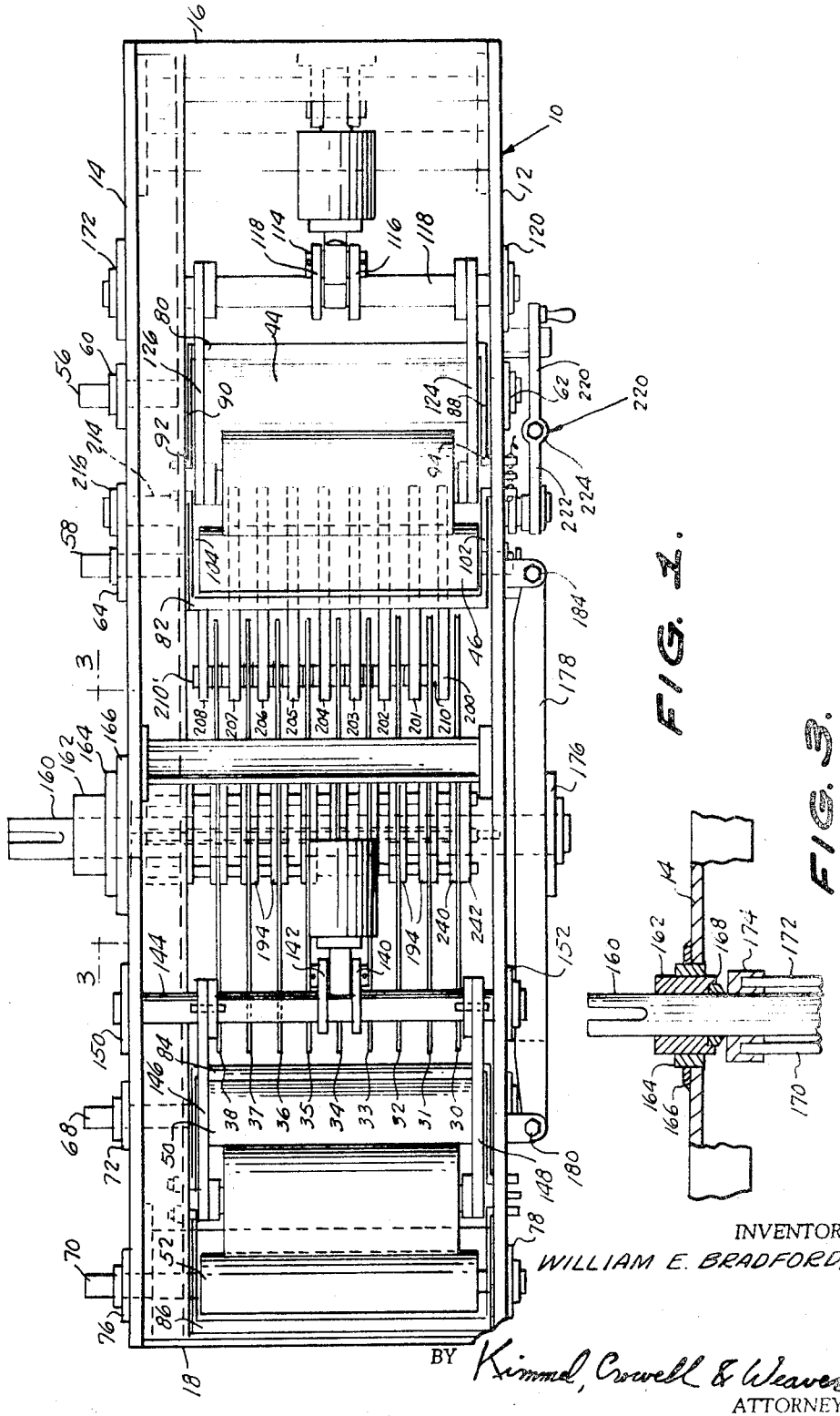
FIGURE 1 is a top plan view of a preferred embodiment of a ganged circular saw assembly which constitutes this invention.
Figure 2:
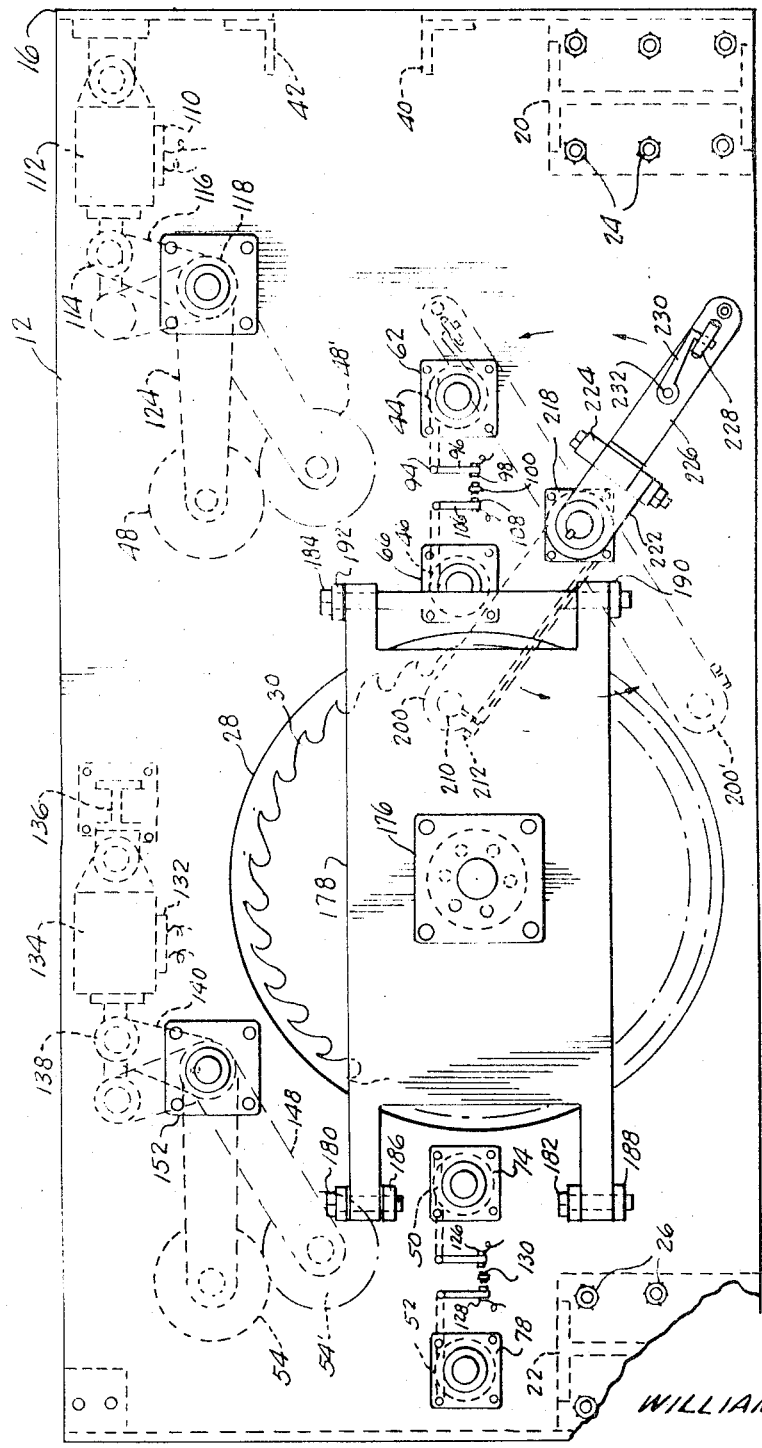
FIGURE 2 is a side elevational view showing the important elements and constructional features of the invention as shown in FIGURE 1.

Reference is now made to FIGURES 1, 2 and 3. The ganged saw of this invention comprises a frame 10 which includes vertical side frame members 12 and 14 and end members 16 and 18 which are provided with openings through which the board to be cut may pass. Most of the elements and mechanisms of the saw are mounted in the side members 12 and 14 by means of shafts or supports which extend transversely of the frame between the sides.

The overall arrangement of the saw assembly of this invention can be best understood by reference to FIGURE 2. The side portions 12 and 14 are secured together in spaced relation by a pair of I-beams 20 and 22 at the respective ends of the side members, the I-beams being secured by bolts 24 and 26 or equivalent securing means. The sidewall member 12 is provided with a circular opening 28 of a size sufficient to receive the circular saw 30, shown in FIGURE 2, and the other circular saws 31 through 38, as shown in FIGURE 1.

The receiving end of the frame is provided with a pair of guides 40 and 42 through which the board to be cut is passed. As the board passes through the saw assembly, it rests upon a pair of rollers 44 and 46 and is held in engagement by means of a roller 48, two positions of which are shown in FIGURE 2.

The board or other material is then sawed by the saws 30 through 38 and the sawed pieces thereof rest on a pair of rollers 50 and 52, and are held in engagement therewith by means of a roller 54, two positions of which are shown in FIGURE 2. The cut material then passes out of the frame to a supporting stand or is otherwise carried away.

The rollers 44 and 46 are driven by means of shafts 56 and 58 which are, respectively, mounted by means of bearings 60 and 62 and bearings 64 and 66. Similarly, rollers 50 and 52 are driven by shafts 68 and 70 and are supported, respectively, by bearings 72 and 74 and by bearings 76 and 78.

The operation of the rollers 48 and 54 are controlled by sets of trip bars which close electrical circuits to operate the moving actuators for these rollers. These trip bars are shown at 80 and 82 at the input end of the frame and by 84 and 86 at the output end of the frame. Bar 80 is mounted on a pair of arms 88 and 90 and by a pivotal connection at 92 and 94. A downwardly extending arm 96, as shown in FIGURE 2, carries a contact 98 which, when the trip bar 80 is depressed, contacts the fixed contact 100. Similarly, trip bar 82 is carried by arms 102 and 104 and through arm 106 closes the contact 108 with the fixed contact 100. When contact 98 and 108 both contact the fixed contact 100, a circuit is completed through wiring, not shown for clarity, to actuate a switch mechanism shown at 110 which, in turn, energizes a fluid linear motor 112, pivotally mounted on the end plate 16 at one end. The other end of the fluid motor is connected by a pivot connection 114 to a pair of arms 116 which, in turn, are fixedly secured to a rotatable shaft 118, supported by bearings 120 and 122 and connected, at their respective ends thereof to a pair of arms 124 and 126. The roller 48 is carried between the distal ends of arms 124 and 126. Thus, when the fluid motor 112 is actuated through the switch mechanism 110, the roller 48 is caused to move downwardly to the position shown at 48' where it engages the top of the board or other material to be sawed and holds the material in contact with the two driven rollers 44 and 46. Once the end of the material to be sawed has passed the trip bar 80, then the contact 98 moves away from the fixed contact 100 and the circuit is broken through contacts 108, 100 and 98 thus releasing, by means of the switch mechanism 110, the fluid motor 112 permitting the roller 48 to move to its normal position. It will be understood that the contacts 98, 100 and 108 would normally be enclosed but are shown exposed for purposes of clarity. The fluid motor 112 is of the conventional linear reciprocating type and the switch 110 may be of any conventional type. Such a switch as the type wherein an electromagnetic relay opens or closes a valve, is is known in the prior art, may conventionally be used. These details are well within the skill of the art, once the overall combination and purpose is pointed out, and further explanation is not deemed necessary.

At the output end of the frame, movable contacts 126 and 128 are caused to contact the fixed contact 130 as the trip bars 84 and 86 are depressed by the movement of a log or board thereover. In the manner just described, the closure of these series contacts actuates a switch mechanism 132 to energize the fluid motor 134 which is pivotally connected at one end to a cross bar 136. The other end, in the manner just described, is connected through a pivotal connection 136 to a pair of upwardly extending arms 140 and 142 which are secured to a shaft 144. The shaft is, in turn, secured to a pair of spaced arms 146 and 148 which carry the roller 54. Thus, when, and only when, both of the trip bars are depressed the roller 54 will be caused to move downwardly to engage the top of the board as it passes through the saw frame. As soon as one of the contacts, for example contact 126, is removed from the fixed contact 130, then the circuit is broken and the fluid motor is deenergized and the roller 54 returns to its normal raised position. The shaft 144 is supported by means of bearings 150 and 152 in a conventional manner.

Referring now to FIGURE 1 in particular and FIGURE 3 for detail, it will be seen that the saws 30 through 38 are carried on a shaft 160 which constitutes the drive means for the saws. It will be understood that the shafts 56, 58, 68, 70 and 160 may be driven through the use of pulleys and belts, sprockets and chains, by motors directly or by any other conventional means.

The shaft 160 is supported by a journal bearing 162 held in the frame member 12 by a collar 164 and a weld flange 166. Of course, any conventional bearing or journal means may be used. This construction is best shown in FIGURE 3. A seal 168 for the journal bearing 162 may be provided interiorly.

As best shown in FIGURE 3, a plurality of rods, for example as shown at 170 and 172, are secured in spaced parallel relation from the shaft 160 by means of a collar 174 which is provided with a plurality of apertures for receiving the ends of the rods. The collar 174 is secured to the shaft for rotation therewith. The illustration in FIGURE 3 shows one end bearing portion of the saw assembly but it will be understood that, with the modifications noted hereinafter, the bearing construction is the same on both ends of the shaft 160. The saws 30 through 38 are provided with a plurality of apertures for receiving the rods. These apertures are spaced apart and are arranged, preferably, in a regular arrangement about the center of the shaft 160. In the preferred embodiment, six such rods are preferred. This construction constitutes a very important facet of the present invention.

The other end of the shaft 160 is supported by a bearing 176 which is carried by a removable cover plate 178 which is secured at each end. Bolts 180 secure the cover plate 178 to the frame at one end and bolt 184 secures the cover plate at the other end to the frame by means of a plurality of support brackets shown at 186, 188, 190 and 192. It will be understood that the cover plate 178, which carries the bearing 176, may be removed in its entirety or may simply be pivoted outwardly of the bolts 180 and 182 by removing the bolt 184. There is sufficient flexibility in the bearing arrangement and in the shaft to permit the shaft to be received in the bearing 176 when the cover plate 178 is pivoted back into position. Thus the shaft 160 is supported at both ends.

The saws 30 through 38 have apertures therein, and may be provided with reenforcing collars, of the type shown generally at 194 in the center thereof. Each of the saws is provided with a central aperture for receiving the shaft 160 and, in addition, is provided with individual apertures for receiving the several rods. Of course, a single aperture having the proper configuration, such as an aperture having a central open portion with a plurality of extended openings therein may be used and would be the full equivalent. It will be understood, that since the collar 174 is secured to the shaft for rotation and the saws are provided with apertures for receiving the shaft 160 and the rods 170, 172, etc., the saws may move linearly along the shaft 160 and yet be caused to rotate as the shaft 160 rotates. The rotary motion from the drive means 160 is transmitted through the collar 174 and the rods 170, 172, etc.

In contrast with the devices of the prior art, wherein a key was the common mode of transmitting the force from the drive shaft to the saw, the present invention prevents binding of the saws on the shaft. Once the saw tends to bind it does not freely move along the shaft and is sometimes very difficult to move and to properly adjust on the shaft. The present invention, however, probably because of the large number of points of drive, obviates the difficulties inherent in using a key or the equilavent construction. No binding is experienced and the saws are free to shift along the length of the drive shaft and the rods.

It will be apparent that if the saws are freely reciprocably movable along the shaft and the rod some means must be provided for spacing them apart desired distances. Such means are provided in the present invention and constitute a highly important object thereof.

As best shown in FIGURE 1, a plurality of arms shown at 200 through 208, extend between the saws and are provided with gauging guides shown at 210. The gauging guides are received in openings through the ends of the arms and the openings are clamped around the gauging guides by means of a bolt 212 as best shown in FIGURE 2. The detail construction of only one of the arms is shown and it will be understood that the construction of all the arms is substantially identical. The arms are mounted in spaced relation along a shaft 214 which is supported by bearings 216 and 218 which, in turn, are secured to the side members 12 and 14. On the external end of the shaft 216 there is provided a handle 220 which includes an arm portion 222 secured to the end of the shaft 216. A pivotal connection 224 connects the remainder of the handle 226 to the portion 222. As best shown in FIGURE 2, the portion 226 is provided with an opening through which a U-bolt or ring 228 may extend. A keeper 230 is pivotally mounted, as by a pin 232, on the portion 226 for engaging the ring or U-bolt 228 to prevent movement of the handle portion 226. Thus, the handle prevents movement of the arms when secured by means of the keeper 230 and the U-bolt 228 and, when disengaged from the U-bolt permits movement of the arms downward to the position shown at 200′ to permit removal or rearrangement of the saws.

Referring to FIGURE 4 which, except as noted, is similar in construction to the embodiment just described, it will be seen that rollers 48a and 54a, which are supported respectively, by arms 126a and 148a and shafts 118a and 144a, ride under the force of gravity on top of a board 300 or other work which is to be cut. The saw 30a is similarly supported by a shaft 160a and is rotated by means of rods 170a, 172a, etc. A principal difference resides in the disposition and construction of the arms 200a which carry gauging guides 210a thereon and which are supported by a shaft 214a. It will be understood that the arm shown is merely exemplary of the construction and that the other arms are similarly constructed.

As the work piece, the board 300, moves from right to left as viewed in FIGURE 4, it is held in contact with the driven rollers 44a and 46a by means of the roller 48a and is cut by means of the saw 30a, etc., the saws being held in the desired spaced apart relation by means of the gauging guides 210a. The arms 200a are so disposed and constructed that the ends thereof ride upon the top of the work piece 300 during sawing. On the exit end, the work piece is driven to the right by the rollers 50a and 52a and is held in contact with the driven rollers by the roller 54a.

It will be understood that the arms 200 are secured to the shaft 214 so that rotation of the shaft causes the arms to move about in an arc. However, the arms are free to move longitudinally of the shaft which is disposed transversely of the frame. Thus, the saw spacing is controlled exclusively by the dimensions of the gauging guide between adjacent saws.

The present guide system, as will be seen, serves a twofold purpose. First, the guide system serves to hold the several saw blades set at a given distance from each other in order to saw boards of a definite, given width. Secondly, the guide system disclosed, working in unison with the saws which are free to float on the plurality of drive rods and on the shaft, allows the saw blades to make a straight, unvarying cut the full length of the cant. Also, setting up the guide system, when one wishes to change the board width, requires a minimum of time and of skilled help.

With respect to the embodiment shown in FIGURE 4, the positioning of the guides on top of the material to be cut provides several advantages. Where the guides are situated beneath the mandrel, the blades were guided in the least effective position in the cutting circuit, at the end of the cut. With the embodiment of FIGURE 4, the saw guides are suspended from a shaft above the saw and the work piece. Thus, the saw is held in a constant straight cutting path, as it passes through a log, by the top guide arm. The log itself, as it is forced through the blades, pushes the guide arms into the best position for guiding the saw as it begins its cut into the log and holds it at a uniform constant position throughout the whole cutting procedure.

As previously indicated, floating saw collars are conventionally driven upon a solid shaft into which key ways have been cut to transfer power to the saw blades while, at the same time, permitting the blades to slide relative to each other longitudinally of the shaft. Such an arrangement limits the amount of power which can be applied to the saws because wear to the keys and the key ways makes the saw collars tend to bind on the shaft such that they do not slide easily. In the present invention, by the use of a number of small diameter rods or shafts, for example, disposed in a hexagonal pattern, rather than a single heavy shaft, the need for key ways is eliminated. The collars and saws, guided by the top guides, are free to float on the rods. At the same time, the amount of horsepower used to drive the saw blades can be increased very substantially. The fact that the saw blades are free to slide on the drive rods is a tremendous advantage when used with the top guides. A circular saw naturally flexes and bends as it cuts into a log. The top guides hold the top of the saw in a constant position as it enters the log and, since the blades themselves can float on the drive rods, they line themselves up, always in line with the top or beginning of the cut. There is, consequently, a reduced amount of wear and tear on the saw blades due to the reduced friction resulting from saw distortion taking place while the blades are actually in the log.

By experimentation, it has been found that each saw, of a plurality of circular saws, tends to act as a pump, taking air in between the saw blades and discharging it along the saw blade faces. This creates an air circulation similar to a conventional impeller. When two saw blades were set up on a rotating shaft about twelve inches apart, without guides, and permitted to float free, it was discovered that the saw blades would come together. The rate of closure was inversely proportional to the distance between the saw blades.

Four saw blades were mounted on the shaft with all of the saw blades being edge guided. The two center saw blades ran perfectly; however, the two outside saw blades ran closer together at the back, the edge portion opposite the guides, because of the differential in air pressure. The resulting friction on the guides heated the saw blades making them impossible to control. When four saw blades were mounted on the shaft with the inner saw blades being guided, as shown in the drawing, and the end blades locked to the shaft without guides, the unit operated perfectly. The practical solution, then, was found to be the use of one side of the saw frame and a saw blade, adjusted for proper width and locked in position on the shaft, for the other side of the cut. The teeth on the outer saw blade should be wide enough to cut the blade free when the saw blade distorts from air pressure.

Therefore, as shown in FIGURE 1, the outer saw blade 30 is secured by means of end collars fixedly to the shaft and to the rods so that it is not free to reciprocate. This permits operation of the remaining blades in fairly close proximity without difficulty or distortion. It will be noted that the gauging guide 210 contacts the blade 31 but does not contact the blade 30, permitting the blade 30 to run free.

OPERATION

The following is an exemplary procedure for preparing the saw unit for operation.

First, the keeper 230 is lifted and the handle portion 226 moved out to permit the entire guiding arm assembly to move to the position shown at 200'. The bolt or pin 184 is removed and the cover 178 is permitted to swing on the bolts 180 and 182 pulling the mandrel bearing 176 out from the end of the shaft 160. The shaft, which constitutes a mandrel, and the drive rods remain in position. The saw blades are now free to be slid on or off the drive rods.

The necessary saw blades are removed and placed on the drive rods.

The appropriate gauging guide inserts 210 are inserted in the arms and are secured in place. The first insert is set in the guide arm such that the distance from the side of the frame which acts as a guide to the inside face of the gauging guide insert is equal to the width of the board desired. The gauging guide inserts in the remaining guide arms are precut to the desired length such that they will space the saw blades the desired distance apart to produce the desired width of boards. A small gauge tool is inserted between each of the guide inserts. This tool is as thick as the saw blades plus a small amount of running clearance. The guides are then squeezed together such that the faces contact the tool.

The required number of saw blades are positioned on the mandrel and roughly positioned to receive gauging guide inserts on the arms. All of the teeth in each saw line up so the saws are turned so that the gullet of a tooth lines up with a guide insert. The gauging and guiding unit is then swung into operating position and locked in this position.

The last saw blade 30 is installed on the mandrel and locked in place by the end collars 240 and 242. As previously pointed out, this saw solves the problem raised by the air pressure differential on the outside end of the saw. The saw frame controls the air pressure on the other end of the saw. The closure gate 178 is returned to position and the end of the shaft 160 is received in the bearing 176 and the assembly is ready for operation.

As a work piece is moved in from the right, as viewed in FIGURE 1, it is engaged by the rollers and carried forward through the saw and ripped into a plurality of pieces according to the number of saw blades. The pieces are carried out by the rollers at the other end of the frame.

It will be seen that the foregoing invention accomplishes all the objects set forth and solves problems which have not heretofore been recognized.

It will be understood that the embodiment disclosed is exemplary and is a preferred embodiment but that departures therefrom may be made without departing from the spirit and scope of the invention as defined in the appended claims.

I claim:

1. In a ganged circular saw assembly of the type which includes a frame, a plurality of circular saws, means supporting the circular saws in the frame in substantial alignment transversely of the frame and means for guiding lumber or logs to the saws for making plural cuts therein, the improvement wherein the means supporting the circular saws comprises:

a plurality of parallel rods extending transversely of the frame, said saws having spaced openings for receiving said rods;

means securing the rods together, said means being rotatably supported in said frame; and drive means for rotating said securing means for thereby revolving said rods about a centerpoint therebetween and for rotating said saws in unison.

2. The saw assembly of claim 1 further comprising:

a plurality of guide arms;

means securing one end of the arms in substantial alignment transversely of the frame, the other end of said arms individually extending between respective saws, said saws being received on said rods for free relative movement along said rods; and a plurality of gauging guides secured to the other end of said arms and extending substantially transversely of the frame for positioning the saws in a desired relatively spaced configuration and maintaining said saws in such position during sawing by engagement of said guides with the sides of said saws.

3. The saw assembly of claim 2 wherein the means securing the one end of the arms comprises:

a rotatable shaft secured in the frame for simultaneously moving the guides through an arc from the position between the saws to a position exterior to the saws.

4. The saw assembly of claim 3 wherein the rotatable shaft securing the arms is disposed above the center of the saws and forwardly in the direction of normal rotation of the saws such that the arms are inclined downwardly from the shaft toward the saws and are so disposed and constructed that when a log or the like is being sawed the guides ride along the top of such log and position the saws during such sawing.

5. The saw assembly of claim 3 wherein the rotatable shaft securing the arms is disposed below the center of the saws and forwardly in the direction of normal rotation of the saws such that the arms are inclined upwardly from the shaft and position the guides so that during sawing such guides are disposed below the material being sawed.

6. The saw assembly of claim 1 wherein ther are six equally spaced rods received in a like number of openings in the saws and the means securing the rods together comprise:

a collar received on a shaft, said shaft comprising the drive means, said collar having a plurality of apertures therein receiving said rods.

7. In a ganged circular saw assembly of the type which includes a frame, elongate drive means mounted transversely of the frame for rotation, a plurality of circular saws received on the drive means for relative reciprocable movement thereon, and means drivingly interconnecting the drive means and the circular saws for rotating said saws without preventing reciprocable movement thereof, the improvement further comprising:

a plurality of guide arms;

means securing a like point of each of the arms in substantial alignment transversely of the frame for positioning a free end of the arms for individual movement between the respective saws for spacing said saws; and a plurality of gauging guides secured to the other end of said arms and extending substantially transversely of the frame for positioning the saws in a desired relatively spaced configuration and maintaining said saws in such position during sawing by engagement of said guides with the sides of said saws.

8. The saw assembly of claim 7 wherein the means securing the like point of each of the arms comprises:

a rotatable shaft secured in the frame for simultaneously moving the guides through an arc from the position between the saws to a position exterior to the saws.

9. The saw assembly of claim 8 wherein the rotatable shaft securing the arms is disposed above the center of the saws and forwardly in the direction of normal rotation of the saws such that the arms are inclined downwardly from the shaft toward the saws and are so disposed and constructed that when a log or the like is being sawed the guides ride along the top of such log and position the saws during such sawing.

10. The saw assembly of claim 8 wherein the rotatable shaft securing the arms is disposed below the center of the saws and forwardly in the direction of normal rotation of the saws such that the arms are inclined upwardly from the shaft and position the guides so that during sawing such guides are disposed below the material being sawed.

References Cited

UNITED STATES PATENTS

| | | | |
|---|---|---|---|
| 1,251,844 | 1/1918 | Trout | 143—37 |
| 1,390,958 | 9/1921 | Hulbert | 143—37 |
| 1,738,145 | 12/1929 | Hulbert | 143—37 |
| 1,985,500 | 12/1934 | Horstkotte | 143—37 |
| 3,093,168 | 6/1963 | Colt | 143—37 |
| 3,285,302 | 11/1966 | Thrasher | 143—37 |

HARRISON L. HINSON, Primary Examiner